US008798575B2

(12) United States Patent
Duan et al.

(10) Patent No.: US 8,798,575 B2
(45) Date of Patent: Aug. 5, 2014

(54) METHOD FOR IMPROVING SERVICE DATA FLOW BASED CHARGING AND SYSTEM THEREOF

(75) Inventors: Xiaoqin Duan, Shenzhen (CN); Yajuan Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1610 days.

(21) Appl. No.: 11/558,774

(22) Filed: Nov. 10, 2006

(65) Prior Publication Data

US 2007/0124160 A1 May 31, 2007

Related U.S. Application Data

(63) Continuation of application No. PCT/CN2005/000665, filed on May 12, 2005.

(30) Foreign Application Priority Data

May 12, 2004 (CN) .......................... 2004 1 0044433

(51) Int. Cl.
*H04M 11/00* (2006.01)
*H04L 12/14* (2006.01)
*G06Q 40/02* (2012.01)
*H04M 15/00* (2006.01)
*H04W 4/24* (2009.01)

(52) U.S. Cl.
CPC ............ *H04L 12/14* (2013.01); *H04L 12/1467* (2013.01); *H04W 4/24* (2013.01); *H04M 2215/0108* (2013.01); *H04M 2215/22* (2013.01); *H04L 12/1485* (2013.01); *H04M 2215/0188* (2013.01); *G06Q 40/025* (2013.01); *H04M 15/58* (2013.01); *H04M 2215/204* (2013.01); *H04M 15/745* (2013.01); *H04M 15/66* (2013.01)
USPC .......................... 455/405; 455/432.1; 455/416

(58) Field of Classification Search
USPC ................ 455/405, 432.1, 416; 370/392, 394
See application file for complete search history.

(56) References Cited

U.S. PATENT DOCUMENTS 5,781,431 A 7/1998 Duret et al.
2007/0274522 A1* 11/2007 Boman et al. ................. 380/247

FOREIGN PATENT DOCUMENTS

CN 1411305 A 4/2003
CN 1429005 A 7/2003

(Continued)

OTHER PUBLICATIONS

3GPP; 3rd Generation Partnership Project; Technical Specification Group Services and Systems Aspects; Overall High Level Functionality and Architecture Impacts of Flow Based Charging, Release 6 3GPP TS 23.15 V.6.0.0.*

(Continued)

*Primary Examiner* — Manpreet Matharu
(74) *Attorney, Agent, or Firm* — Staas & Halsey LLP

(57) ABSTRACT

A method for improving service data flow based charging and a system thereof are disclosed. A CRF may determine, according to input information provided by an AF or TPF, that the charging method for the current data flow service is an online or offline charging method, and provide the TPF with the charging rules with the corresponding mechanism. Moreover, the CRF may provide the TPF with the address information of an OCS or OFCS corresponding to the UE, to enable the TPF to address the corresponding OCS according to the address information of the OCS and trigger the following credit request procedure for the UE, or enable the TPF to address the corresponding OFCS according to address information of the OFCS and send collected charging data information of the UE to the OFCS. Therefore the charging procedure based on the FBC mechanism is more complete and more reasonable.

20 Claims, 4 Drawing Sheets

(56) References Cited

FOREIGN PATENT DOCUMENTS

| EP | 0639013 A1 | 2/1995 |
|---|---|---|
| WO | WO 03/092317 A2 | 3/2003 |
| WO | WO 03/092317 A1 | 11/2003 |

OTHER PUBLICATIONS

ETSI Standards, *European Telecommunications Standards Institute*, Sophia-Antipo, FR (TS 32.015 V 3.12.0), No. V3120 (Dec. 31, 2003), pp. 1-66, XP002419212 ISSN: 0000-0001.
Technical Specification Group Services and System Aspects (TS 23.125 V6.2.0), [Online] Sep. 2004, pp. 1-47, XP002427252 Retrieved from the Internet: URL: http://www.3gpp.org/ftp/Specs/html-info/23125.html> [retrieved on Mar. 28, 2007].
3rd Generation Partnership Project; Technical Specification Group Services and System Aspects; Overall High Level Functionality and Architecture Impacts of Flow Based Charging; Stage 2(Release 6).
English Translation of the Written Opinion of the International Search Authority for International Application No. PCT/CN2005/000665, dated Sep. 15, 2005.
Chinese office action for Chinese patent application No. 200410044433.3, dated Sep. 22, 2006.
European office action for European patent application No. 05745147.8, dated Jun. 26, 2007.
European office action for European patent application No. 05745147.8, dated Nov. 28, 2007.

* cited by examiner

METHOD FOR IMPROVING SERVICE DATA FLOW BASED CHARGING AND SYSTEM THEREOF

This application is a continuation of International Patent Application No. PCT/CN2005/000665, filed May 12, 2005, which claims priority to Chinese Patent Application No. 200410044433.3, filed May 12, 2004, all of which are hereby incorporated by reference.

FIELD OF THE INVENTION

The present invention relates to charging techniques, and particularly to a method for improving service data flow based charging and a system thereof.

BACKGROUND OF THE INVENTION

Along with the wide applications of packet data services, an accurate and appropriate charging method for packet data services is concerned by the operators.

FIG. 1 is a flowchart illustrating activation, data transmission and deactivation of Packet Data Protocol Context (PDP Context).

Step 101: a User Equipment (UE) sends an Activate PDP Context Request to a Serving GPRS Support Node (SGSN). The Activate PDP Context Request carries the information of a Network Layer Service Access Point Identifier (NSAPI), a PDP type, an Access Point Name (APN), a required Quality of Service (QoS) parameter, a Transaction Identifier (TI) and etc. The NSAPI serves as a part of a Tunnel Identifier (TEID) between the SGSN and a Gateway GPRS Support Node (GGSN), for identifying the PDP Context. The PDP type includes a Peer-Peer Protocol (PPP) type, an Internet Protocol (IP) type and etc. The APN is provided by the UE for the SGSN, the SGSN addresses the corresponding GGSN according to the APN, the corresponding GGSN determines an external network which the UE shall access according to the APN; also, the UE may not provide the SGSN with the APN, in this case, the SGSN chooses a default APN according to the subscription information of the UE. The QoS parameter is the desired quality requirement of the packet data service designated by the UE. The TI is used for the UE to identify one PDP Context.

Step 102: The SGSN receives the Activate PDP Context Request, performs a security check and encryption with the UE. This step is optional.

Step 103: the SGSN resolves the address information of the GGSN according to the APN. If the SGSN is able to resolve the address information of the GGSN, a TEID is created for the PDP Context. The TEID is a combination of the International Mobile Subscriber Identity (IMSI) and the NSAPI, to identify the unique PDP Context between the SGSN and the GGSN. The SGSN sends a Create PDP Context Request to the GGSN, the Create PDP Context Request carries a PDP type, a PDP address, an APN, a QoS parameter, a TEID, a select mode, etc, wherein the PDP address is the IP address of the UE, which is an optional parameter. When the PDP address is not carried in the Create PDP Context Request, the IP address may be assigned to the UE by the GGSN or by the Packet Data Network (PDN) which establishes a connection with the UE finally. The select mode is that for the APN, indicating that the APN is selected by the UE or by the SGSN. If the SGSN is unable to resolve the address information of the GGSN according to the APN, it rejects the Create PDP Context Request initiated by the UE.

Step 104: upon receiving the Create PDP Context Request, the GGSN determines the external PDN according to the APN, assigns the Charging ID, initiates the charging procedure and negotiates the QoS parameter. If the GGSN is able to satisfy the service quality requirement defined by the QoS parameter, it returns to the SGSN a Create PDP Context Response which carries the TEID, the PDP address, the Backbone Bearer protocol, the QoS parameter, the Charging ID and etc. If the GGSN is unable to satisfy the service quality requirement defined by the QoS parameter, it rejects the Create PDP Context Request initiated by the SGSN and the SGSN then rejects the Activate PDP Context Request initiated by the UE.

Step 105: upon receiving the Create PDP Context Response, the SGSN inserts the NSAPI and the GGSN address information into the PDP Context to identify the PDP Context. selects the radio priority according to the QoS parameter, and then returns to the UE an Activate PDP Context Accept which carries the information of the PDP type, the PDP address, the TI, the QoS parameter, the radio priority, the PDP configuration options and etc; and the SGSN initiates the charging. Upon receiving the Activate PDP Context Accept, the UE establishes a route to the GGSN and thus a transmission tunnel to the PDN, by which the data can be transmitted.

Step 106: the UE transmits the data via the SGSN and the GGSN to the PDN.

Step 107: after completing the data transmission, the UE sends to the SGSN a Deactivate PDP Context Request which carries the TI.

Step 108: upon receiving the Deactivate PDP Context Request, the SGSN performs the security examination and encryption with the UE. This step is optional.

Step 109~Step 111: the SGSN sends to the GGSN a Delete PDP Context Request which carries the TEID. Upon receiving the Delete PDP Context Request, the GGSN terminates the charging for the UE, deletes the PDP Context corresponding to the TEID, and sends to the SGSN a Delete PDP Context Response which carries the TEID. Upon receiving the Delete PDP Context Response, the SGSN terminates the charging for the UE, deletes the PDP Context corresponding to the TEID, and sends to the UE a Deactivate PDP Context Response which carries the TI. Upon receiving the Deactivate PDP Context Response, the UE deletes the PDP Context corresponding to the TI.

As can be seen from the procedure illustrated in FIG. 1, in the prior GPRS charging system, the charging is set to be started when the PDP Context is activated and be terminated when the PDP Context is deleted. Thus, the charging can be implemented based on the data flow transmitted through the PDP Context or on the duration of activated state of the PDP Context. However, in practical applications, after a transmission tunnel is established between the UE and the PDN, the UE may obtain multiple services based on one activated PDP Context, such as the Email sending-receiving service, the browsing service based on Wireless Application Protocol (WAP), the file transmission service based on File Transfer Protocol (FTP) and etc. That is, when the PDN can provide multiple services, after a transmission tunnel is established between the UE and the PDN, the multiple services provided by the PDN may be borne by one activated PDP Context. However, the operators may apply different charging policies to different services. For example, an Email sending-receiving service may be charged according to the times of the triggered receiving and sending events, a WAP browsing service may be charged according to the data flow, and a file transmission service may also be charged according to the data flow, while with a charging rate different from that of the WAP surfing service. Therefore, the prior GPRS charging system is unable to apply different charging policies to different services using the same PDP Context as the bearer.

In view of the above, the 3$^{rd}$ Generation Partnership Project (3GPP) is now discussing how to implement Flow Based Charging (FBC). As for a packet data service which is being used by the UE, all the IP flows or IP packets sent and received by the UE are generally called Service Data Flow. The Service Data Flow is the aggregation of a plurality of IP flows, therefore, the FBC is able to reflect the resource occupation of a certain service data flow.

FBC can be regarded to be implemented by filtering the IP flows for different services borne in the same PDP context through different sieve-like "filters" and then charging for different services according to the corresponding "filters". Therefore, the "pore size" of the charging "filter" based on IP flows is much less than that based on one PDP Context. The "pore size" of the charging "filter" can be regarded as to indicate the size of a sieve hole. If the charging is based on one PDP Context, one PDP Context corresponds to one sieve hole; while if the charging is based on IP flows, one IP flow corresponds to one sieve hole and thus one PDP Context corresponds to multiple sieve holes in the FBC mode. Therefore, compared with the charging based on one PDP Context, the FBC provides more abundant charging means for operators or service providers.

The systematic configuration, function requirements and information interacting procedure of FBC are all descried in the standard of 3GPP. Referring to FIG. 2, the systematic configuration of FBC for the online charging includes an Online Charging System (OCS) 206, a Service Data Flow Based Charging Rule Function (CRF) 203, an Application Function (AF) 204, and a Traffic Plane Function (TPF) 205. The OCS 206 includes a Customized Application for Mobile Network Enhanced Logic (CAMEL) based Service Control Point (SCP) 201 and a Service Data Flow Based Credit Control Function (CCF) 202. The CCF 202 is connected through an Ry interface to the CRF 203, the CRF 203 is connected through an Rx interface to the AF 204 and through a Gx interface to the TPF 205; the CCF 202 is connected through a Gy interface to the TPF 205.

Referring to FIG. 2B, the systematic configuration of FBC for the offline charging includes a CRF 203, an AF 204, a TPF 205, a Charging Gateway Function (CGF) 207 and a Charging Collection Function (CCF) 208. The CRF 203 is connected through an Rx interface to the AF 204 and through a Gx interface to the TPF 205, the TPF 205 is connected through a Gz interface to the CGF 207 and to the CCF 208, respectively. Generally, the functions of the CGF 207 and the CCF 208 are implemented by one network entity, which therefore provides the charging gateway functions and the charging collection functions for offline charging and is referred to as an Offline Charging System (OFCS) hereinafter.

According to the definition in 3GPP of the FBC functions, the TPF 205 bears IP flow, and sends a Charging Rules Request to the CRF 203 through the Gx interface when an IP flow bearer is established. The Charging Rules Request carries the UE-related information, the bearer characteristics and the network-related information, wherein the UE-related information may be the Mobile Station International Integrated Services Digital Network (ISDN) Number (MSISDN), the International Mobile Subscriber Identifier (IMSI) and etc; and the network-related information may be the Mobile Network Code (MNC), the Mobile Country Code (MCC) and etc. The bearer may be modified during the transmission of the IP flow, for example, the QoS parameter may be renegotiated, which may lead to different charging rules for the same UE service according to different QoS parameters, such as lower charging rate corresponding to lower QoS parameter. In this case, when the bearer is modified, the TPF 205 may resend a Charging Rules Request to the CRF 203 for new charging rules; the CRF 203 selects appropriate charging rules according to the input information provided by the TPF 205 described above, and returns to the TPF 205 the selected charging rules including the charging mechanism, charging type, charging keys, IP flow filter, charging rule priority and etc. The charging mechanism may be online charging or offline charging; the charging type may be duration based charging or flow based charging, the charging key is a parameter related to the charging rate, whereby the CRF 203 may provide the TPF 205 with the charging rate related parameter instead of the charging rate directly; the IP flow filter is used for indicating the IP flows that need to be filtered for the TPF 205, and the TPF 205 charges for the filtered IP flows according to the charging rules. The IP flow filter may include IP5 vector which may include the information of the source/destination IP address, the source/destination Port Number, the Protocol ID and etc. For example, the CRF 203 may instruct the TPF 205 to filter the IP flow with the source address of 10.0.0.1, the destination address of 10.0.0.2, the source/destination Port Number of 20 and the protocol type of the Transmission Control Protocol (TCP), and then charge for the filtered IP flows according to the charging rules. Finally, when the bearer is removed, the TPF 205 may also send a Charging Rules Request to the CRF 203 for new charging rules, in this case, the CRF 203 may instruct the TPF 205 to delete the charging rules established previously.

The CRF 203 determines the charging rules not only according to the input information from the TPF 205, but also according to that from the AF 204 or the OCS 206. For example, the AF 204 may notify the CRF 203 of the service type that the UE currently uses, and the CRF 203 may determine the corresponding charging rules according to the service type.

The OCS 206 includes the SCP 201 and the CCF 202. The CCF 202 is used for credit control and used in the OCS, whose function can be implemented by adding new function entity to the prior OCS 206. During the online charging procedure, the CCF 202 manages and controls the UE credit and provides the related information used to determine the charging rules through the Ry interface for the CRF 203. The user of the UE may set several credit pools for different packet data services. When the UE uses a certain packet data service, the CCF 202 may authenticate the credit in the credit pool corresponding to the packet data service and provides the TPF 205 with the available UE credit. The user of the UE may also set one shared credit pool for different packet data services. When the UE uses a packet data service, the CCF 202 may authenticate the credit in the credit pool corresponding to the packet data service and provides the TPF 205 with the available UE credit.

In a GPRS network, the TPF 205 is in the GGSN, the AF is a service gateway or service server in the PDN and the CRF 203 is an added logic entity. The TPF 205 is the implementation point of the charging rules and the CRF 203 is the control point of charging rules.

As shown in FIG. 3A, the implementation procedure of issuing the charging rules when a bearer is established includes the following steps:

Step 301A: the UE sends an Establish Bearer Service Request to the TPF, while in a GPRS network, the GGSN receives a Create PDP Context Request.

Step 302A: upon receiving the Establish Bearer Service Request, the TPF sends to the CRF a Charging Rules Request which carries the input information for the CRF to determine the charging rules.

Step 303A~Step 304A: upon receiving the Charging Rules Request, the CRF determines the appropriate charging rules according to the input information carried in the Charging Rules Request or the related input information provided by the AF, and returns to the TPF a Provision Charging Rules message which carries the determined charging rules and the operation instructions for the charging rules.

Step 305A; upon receiving the Provision Charging Rules message, the TPF performs the corresponding operations according to the charging rules operation instructions and the charging rules determined by the CRF.

Step 306A~Step 307A: in the case of an online charging process, the TPF sends a Credit Request to the OCS for the UE credit information. Upon receiving the Credit Request, the OCS determines the UE credit and returns to the TPF a Credit Response, which carries the UE credit if the OCS succeeds in determining the UE credit or carries the value indicating the reason of error if the OCS fails to determine the UE credit.

Step 308A: upon receiving the Credit Response, the TPF returns an Establish Bearer Service Accept to the UE. If the Credit Response carries the UE credit, the TPF accepts the Establish Bearer Service Request initiated by the UE and continues with the following procedure for bearer establishment; otherwise, the TPF rejects the Establish Bearer Service Request initiated by the UE.

As shown in FIG. 3B, the implementation procedure of issuing the charging rules when a bearer is modified includes the following steps:

Step 301B: the UE sends a Modify Bearer Service Request to the TPF, while in a GPRS network, the GGSN receives an Update PDP Context Request;

Step 302B: upon receiving the Modify Bearer Service Request, the TPF sends to the CRF a Charging Rules Request which carries the input information for the CRF to determine the charging rules.

Step 303B~Step 304B: upon receiving the Charging Rules Request, the CRF determines the appropriate charging rules according to the input information carried in the Charging Rules Request or the related input information provided by the AF, and returns to the TPF a Provision Charging Rules message which carries the determined charging rules and the operation instructions for the charging rules.

Step 305B: upon receiving the Provision Charging Rules message, the TPF performs the corresponding operations according to the charging rules operation instructions and the charging rules determined by the CRF.

Step 306B~Step 307B: in the case of an online charging process, the TPF sends a Credit Request to the OCS for the UE credit information. Upon receiving the Credit Request, the OCS determines the UE credit and returns to the TPF a Credit Response, which carries the UE credit if the OCS succeeds in determining the UE credit or carries the value indicating the reason of error if the OCS fails to determine the UE credit.

Step 308B: upon receiving the Credit Response, the TPF returns a Modify Bearer Service Accept to the UE. If the Credit Response carries the UE credit, the TPF accepts the Modify Bearer Service Request initiated by the UE and continues with the following procedure for bearer modification; otherwise, the TPF rejects the Modify Bearer Service Request initiated by the UE.

As shown in FIG. 3C, the implementation procedure of issuing the charging rules when a bearer is removed includes the following steps:

Step 301C: the UE sends a Remove Bearer Service Request to the TPF, while in a GPRS network, the GGSN receives a Delete PDP Context Request;

Step 302C: upon receiving the Remove Bearer Service Request, the TPF sends to the CRF a Charging Rules Request which carries the input information for the CRF to determine the charging rules.

Step 303C~Step 304C: upon receiving the Charging Rules Request, the CRF determines the appropriate charging rules according to the input information carried in the Charging Rules Request or the related input information provided by the AF, and returns to the TPF a Provision Charging Rules message which carries the determined charging rules and the operation instructions for the charging rules.

Step 305C: upon receiving the Provision Charging Rules message, the TPF performs the corresponding operations according to the charging rules operation instructions and the charging rules determined by the CRF.

Step 306C~Step 307C: in the case of an online charging process, the TPF sends a Final Remaining Credit Report to the OCS to notify the OCS that the bearer established for the UE has been terminated. The Final Remaining Credit Report carries the usage information of the UE credit, such as the duration or the data flow of the packet data service used by the UE. Upon receiving the Final Remaining Credit Report, the OCS returns a Credit Report Response to the TPF.

Step 308C: upon receiving the Credit Report Response, the TPF returns a Remove Bearer Service Accept to the UE, accepts the Remove Bearer Service Request initiated by the UE, and continues with the following bearer removing procedure.

As shown in FIG. 4, the implementation procedure of CRF initiating to deliver the charging rules to the TPF includes the following steps:

Step 401: the CRF receives an Internal or External Trigger Event and related information, such as an event in which the AF sends the input information to the CRF to determine the charging rules.

Step 402: the CRF determines the appropriate charging rules according to the input information obtained. The input information may be the charging-related input information provided by the AF. For example, when a service is provided by the AF for the UE and the service is of special charging requirement, such as a charging rate different from that of other services, the AF provides the CRF with the charging input information related to the service. Besides, the input information may also be the charging-related input information provided by the TPF.

Step 403: if the charging rules are modified, the CRF sends to the TPF a Provision Charging Rules message which may carry the determined charging rules and the operation instructions for the charging rules.

Step 404: upon receiving the Provision Charging Rules message, the TPF performs the corresponding operations according to the charging rules operation instructions and the charging rules determined by the CRF.

Step 405~Step 406: in the case of an online charging process, the TPF sends a Credit Request to the OCS for the UE credit information. Upon receiving the Credit Request, the OCS determines the UE credit and returns to the TPF a Credit Response, which carries the UE credit if the OCS succeeds in determining the UE credit or carries the value indicating the reason of error if the OCS fails to determine the UE credit.

As can be seen from the above description, in the implementation procedure of the online charging described in 3GPP standard, when the bearer is established or modified, the TPF requests the UE credit from the OCS and the OCS returns the UE credit to the TPF according to the Credit Request from the TPF. However, neither the triggering mechanism for the online charging nor the means by which the TPF may address the correct OCS of the UE is described in 3GPP standard.

SUMMARY OF THE INVENTION

A method for improving service data flow based charging is provided, which includes the step of: a CRF providing a TPF with the address information of a charging system.

The charging system may be an OCS or an OFCS.

The CRF may provide the TPF with the address information of a plurality of OCSs and selection priorities corresponding to the OCSs; the TPF may first request the credit information from the OCS with a highest selection priority, if not succeed, request the credit information from the next OCS in the descending order of the selection priority levels until succeeds.

The CRF may provide the TPF with the address information of a plurality of OFCSs and the selection priorities corresponding to the OFCSs; the TPF may first send the collected charging data information of the UE to the OFCS with a highest selection priority, if not succeed, send the collected charging data information of the UE to the next OFCS in the descending order of the selection priority levels until succeeds.

Also, a system for improving service data flow based charging is provided, which includes: a CRF, a TPF and a charging system, wherein the CRF provides the TPF with the address information of the charging system.

The charging system may be an OCS or an OFCS.

The CRF may provide the TPF with the address information of a plurality of OCSs and selection priorities corresponding to the OCSs; the TPF may first request the credit information from the OCS with a highest selection priority, if not succeed, request the credit information from the next OCS in the descending order of the selection priority levels until succeeds.

The CRF may provide the TPF with the address information of a plurality of OFCSs and the selection priorities corresponding to the OFCSs; the TPF may first send the collected charging data information of the UE to the OFCS with a highest selection priority, if not succeed, send the collected charging data information of the UE to the next OFCS in the descending order of the selection priority levels until succeeds.

According to the present invention, in the charging implementation procedure, the CRF may determine whether the charging method of the current packet data service is online charging method or offline charging method, according to the input information provided by the AF or the TPF, and then provide the TPF with the charging rules with the mechanism of "online charging" or "offline charging". Moreover, the CRF may provide the TPF with the address information of an OCS or OFCS corresponding to the UE, so that the TPF may address the corresponding OCS according to the address information of the OCS and trigger the following credit request procedure for the UE, or enable the TPF to address the corresponding OFCS according to address information of the OFCS and send collected charging data information of the UE to the OFCS. Therefore the charging implementation procedure based on the FBC mechanism may be more complete and more reasonable.

EMBODIMENTS OF THE INVENTION

Figure 1:
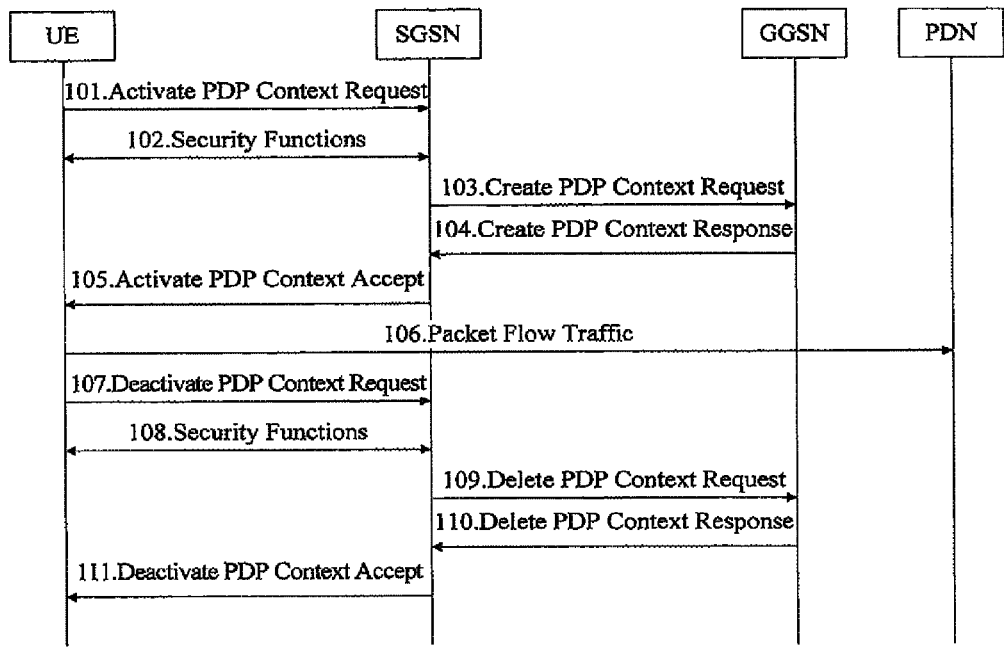
FIG. 1 is a flowchart illustrating the activation, data transmission and deactivation of a PDP Context.
Figure 2A:
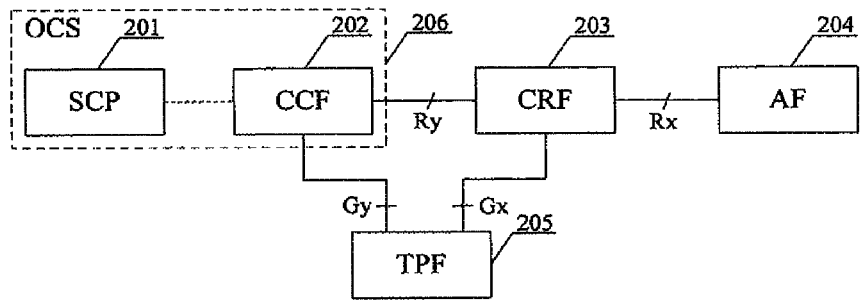
FIG. 2A is a schematic diagram illustrating the FBC systematic configuration for the online charging.
Figure 2B:
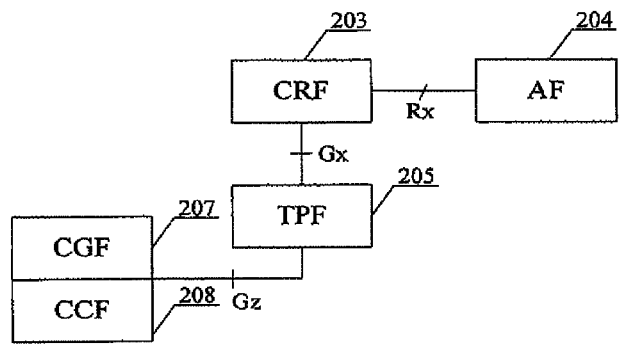
FIG. 2B is a schematic illustrating the FBC systematic configuration for the offline charging.
Figure 3A:
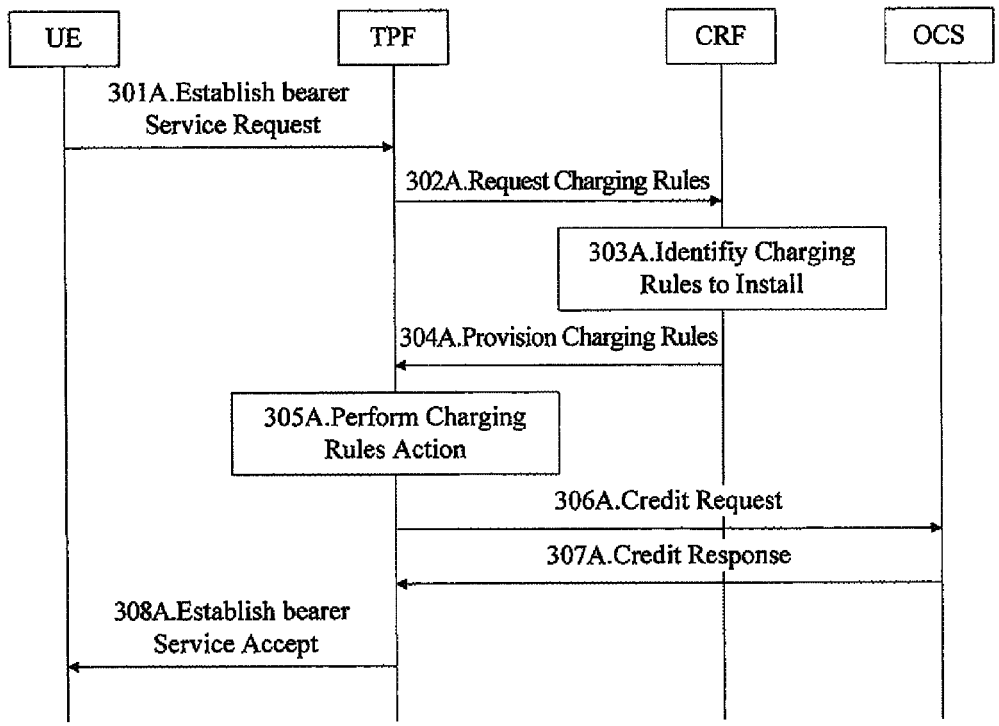
FIG. 3A is a flowchart illustrating the issuance of the charging rules when a bearer is established.
Figure 3B:
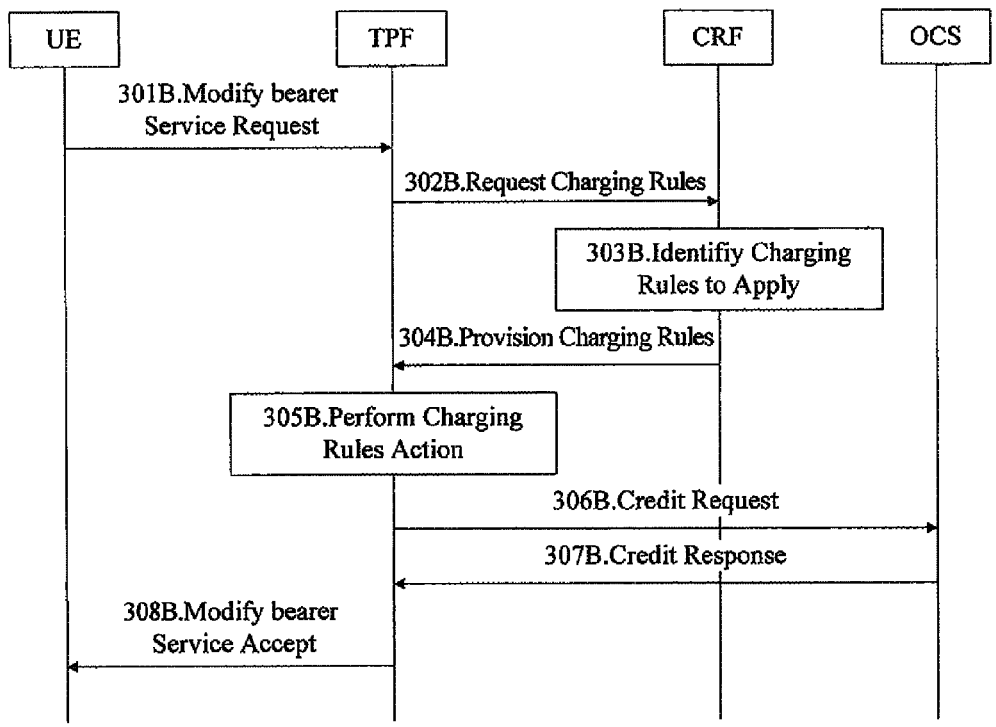
FIG. 3B is a flowchart illustrating the issuance of the charging rules when a bearer is modified.
Figure 3C:
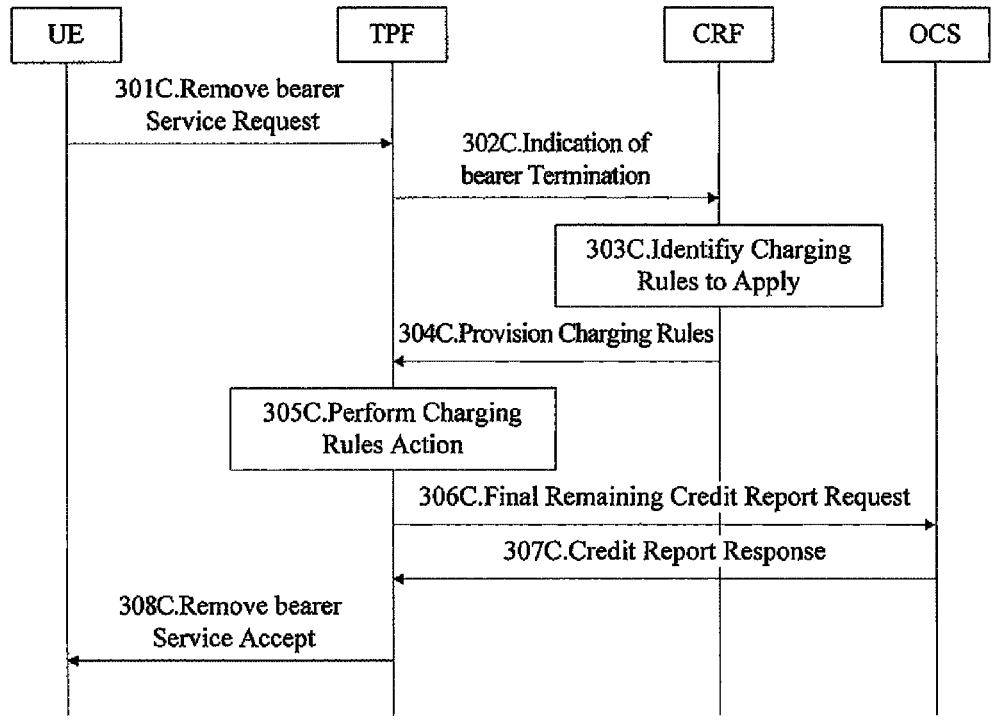
FIG. 3C is a flowchart illustrating the issuance of the charging rules when a bearer is removed.
Figure 4:
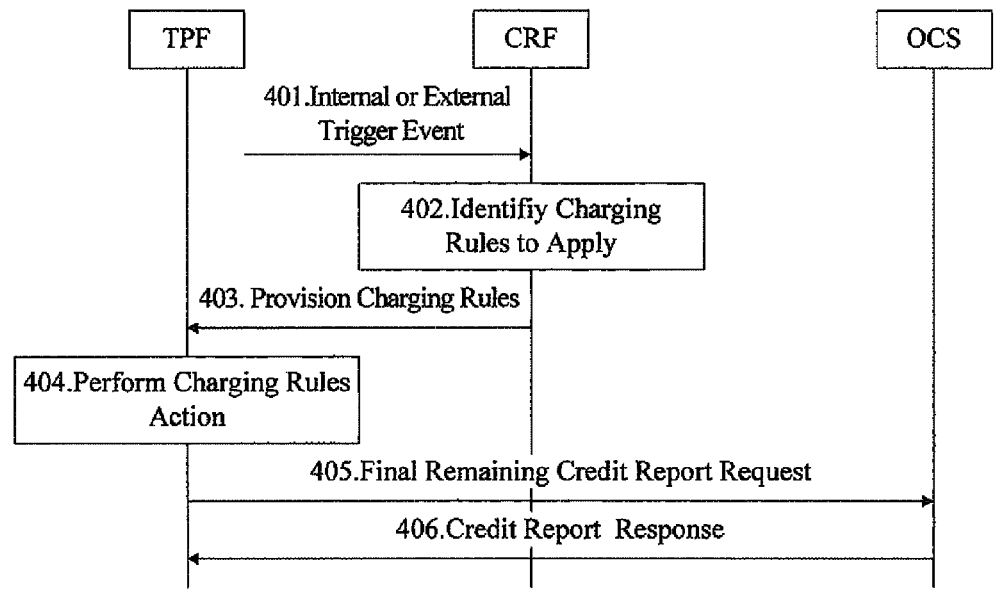
FIG. 4 is a flowchart illustrating that the CRF initiates to deliver the charging rules to the TPF.

In order to further clarify the technical schemes and the advantages of the present invention, the present invention are hereinafter described in details with reference to the embodiments and the accompanying drawings.

In the implementation course of charging according to an embodiment of the present invention, the CRF provides the TPF with the OCS or OFCS address information corresponding to the UE, according to which the TPF addresses the corresponding OCS or OFCS, then the TPF requests the UE credit from the corresponding OCS or sends the collected charging data information of the UE to the corresponding OFCS.

After determining that the charging method for a certain data flow service is online charging, the CRF provides the TPF with the charging rules, the online charging indication to notify the TPF that the current charging method for the data flow service is online charging, and the OCS address information for the TPF to be able to address the OCS corresponding to the UE when the TPF requests the UE credit from the OCS. The OCS address information may be carried in the online charging indication.

Likewise, after determining that the charging method for a certain data flow service is offline charging, the CRF provides the TPF with the charging rules, the offline charging indication to notify the TPF that the current charging method for the data flow service is offline charging, and the OFCS address information for the TPF to be able to address the OFCS corresponding to the UE when the TPF sends the collected charging data information of the UE to the OFCS. The OFCS address information may be carried in the offline charging indication.

The OCS address information may be the address information of the Function that is able to implement the UE credit control in the OCS. For example, the CCF is a function that manages and controls the UE credit in an OCS, therefore the OCS address information may be the address information of the CCF in the OCS.

The CRF may determine whether the charging method of the current data flow service is online charging or offline charging according to the input information provided by the AF. For example, the CRF may determine the charging method according to the service identifier in the charging rules input information provided by the AF. The CRF may also determine whether the charging method of the current data flow service is online charging or offline charging according to the UE information. For example, the CRF may determine that the user of the UE is provided with the prepaid service according to the UE identifier in the charging rules input information provided by the TPF and therefore determine that the charging method of the current packet data service is online charging; For another example, the CRF may determine that the user of the UE is provided with the postpaid service according to the UE identifier in the charging rules input information provided by the TPF and therefore determine that the charging method of the current data flow service is offline charging.

The CRF may store the OCS or OFCS address information corresponding to the UE, or obtain the OCS or OSF address information by interacting with other entities in the network. For example, the CRF may interact with the Home Location Register (HLR)/Home Subscriber Server (HSS) to obtain the OCS or OFCS address information corresponding to the UE.

Besides, there may be multiple OCSs in a network to share the working loads, and a UE may correspond to multiple OCSs. Therefore, a selection priority may be set for each of the multiple OCSs, such as the primarily selected OCS or the secondly selected OCS. The CRF may provide the TPF with multiple OCS addresses corresponding to the UE including the primary OCS address of the primarily selected OCS and the secondary OCS address of the secondly selected OCS. When the TPF fails to establish a credit request session with the primarily selected OCS, it may initiate a credit request to the secondly selected OCS to establish a credit request session with the secondly selected OCS, according to the OCS selection priorities.

Operators may also pre-configure an OCS address in the TPF for all the UEs. Therefore, when the CRF does not provide the TPF with an OCS address, in other words, when the OS address provided by the CRF for the TPF is empty, the TPF sends a Credit Request to the pre-configured OCS to establish a credit request session with the set OCS.

Likewise, there may be multiple OFCSs in a network to share the working loads, and a UE may correspond to multiple OFCSs. Therefore, a selection priority may be set for each of the multiple OFCSs, such as the primarily selected OFCS or the secondly selected OFCS. The CRF may provide the TPF with multiple OFCS addresses corresponding to the UE, including the primary OFCS address of the primarily selected OFCS and the secondary OFCS address of the secondly selected OFCS. When the TPF fails to transmit the charging data information of the UE to the primarily selected OFCS, it may send the charging data information of the UE to the secondly selected OFCS, according to the OFCS selection priorities.

Operators may also pre-configure an OFCS address in the TPF for all the UEs. Therefore, when the CRF does not provide the TPF with an OFCS address, in other words, when the OFCS address provided by the CRF for the TPF is empty, the TPF sends the charging data information of the UE to the pre-configured OFCS.

Figure 5:
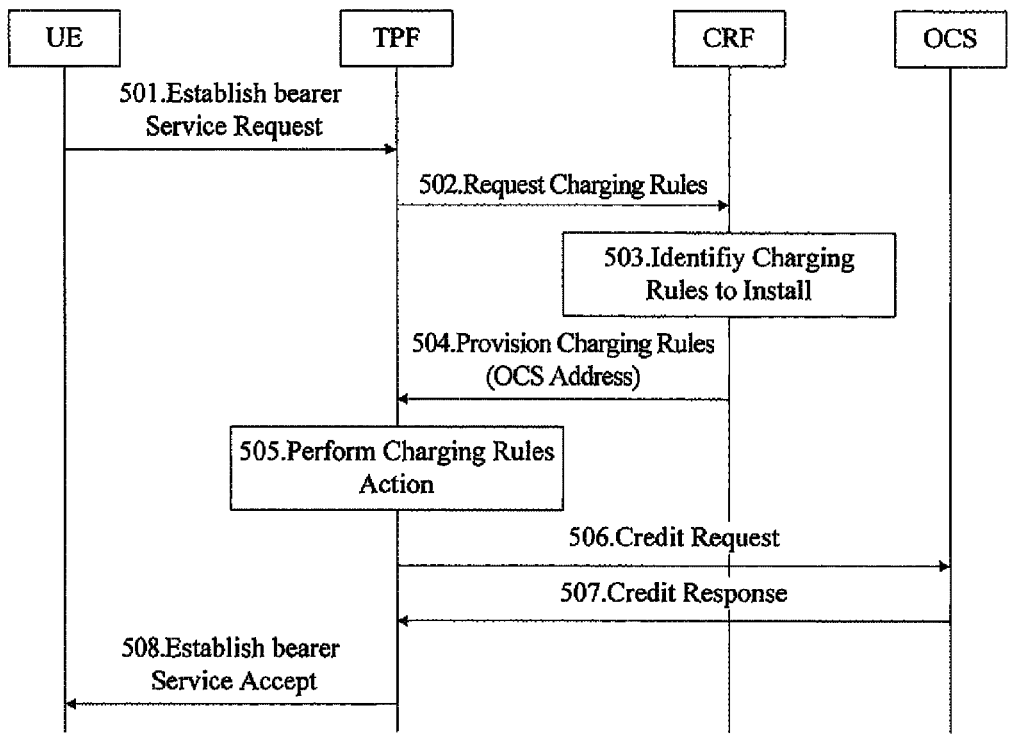
FIG. 5 is a flowchart illustrating the online charging procedure according to an embodiment of the present invention when a bearer is established.

FIG. 5 is a flowchart illustrating the online charging procedure according to the present invention when a bearer is established. As shown in FIG. 5, the online charging implementation procedure when a bearer is established includes the following steps:

Step 501: the UE sends an Establish Bearer Service Request to the TPF, while in a GPRS network, the GGSN receives a Create PDP Context Request.

Step 502: upon receiving the Establish Bearer Service Request, the TPF sends to the CRF a Charging Rules Request that carries the input information for the CRF to determine the charging rules.

Step 503~Step 504: upon receiving the Charging Rules Request, the CRF firstly determines that the charging method of the current packet data service is online charging according to the input information carried in the Charging Rules Request or the related input information provided by the AF; and secondly determines the appropriate charging rules and the corresponding OCS address information according to the UE information; and thirdly returns to the TPF the Provision Charging Rules message which carries the determined charging rules and the operation instructions for the charging rules, and may further carry the online charging indication and the OCS address information.

Step 505: upon receiving the Provision Charging Rules message, the TPF performs the corresponding operations according to the charging rules operation instructions and the charging rules determined by the CRF.

Step 506~Step 507: the TPF determines according to the online charging indication that it needs to request the UE credit from the OCS, and then sends a Credit Request to the corresponding OCS according to the OCS address information. The Credit Request carries the related input information for the OCS to determine the UE credit. Upon receiving the Credit Request, the OCS determines the UE credit according to the input information provided by the TPF and returns to the TPF a Credit Response, which carries the UE credit if the OCS succeeds in determining the UE credit corresponding to the charging rules or carries the value indicating the reason of error if the OCS fails to determine the UE credit.

Step 508: upon receiving the Credit Response, the TPF returns an Establish Bearer Service Accept to the UE. If the Credit Response carries the UE credit, the TPF accepts the Establish Bearer Service Request initiated by the UE and continues with the following bearer establishment procedure; otherwise, the TPF rejects the Establish Bearer Service Request initiated by the UE.

The present invention is described above according to example of the online charging implementation procedure when a bearer is established, while the online charging implementation procedure when a bearer is modified or removed is almost the same as the procedure when a bearer is established, except for the different messages sent. Therefore, the online charging procedures will not be further described herein.

Besides, the offline charging implementation procedure when a bearer is established, modified or removed is quite similar to the corresponding online charging implementation procedure, with such differences as the determination result by the CRF on the charging method of the current packet data service being the offline charging method, the address information carried in the sent messages being the OFCS address information, and the omission of the following credit interacting procedure for the online charging. Therefore, the offline charging procedures will not be further described herein.

Figure 6:
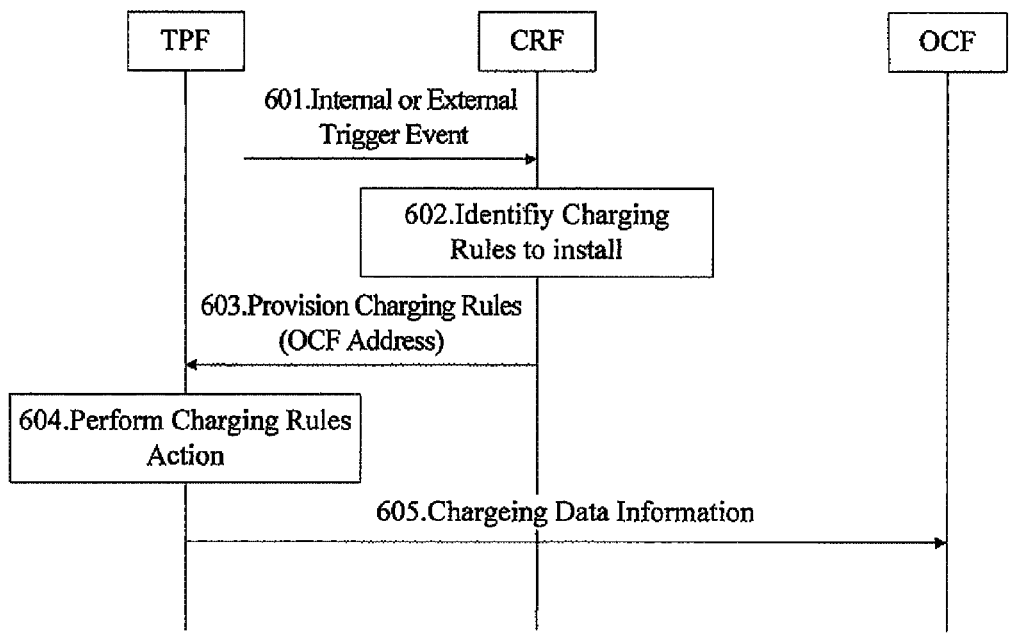
FIG. 6 is a flowchart illustrating the offline charging procedure according to an embodiment of the present invention when the CRF initiates to deliver the charging rules to the TPF.

FIG. 6 is a flowchart illustrating the offline charging procedure according to the present invention when the CRF initiates to deliver the charging rules to the TPF. As shown in FIG. 6, the offline charging implementation procedure when the CRF initiates to deliver the charging rules to the TPF includes the following steps:

Step 601: the CRF receives an Internal or External Trigger Event and related information, such as an event in which the AF sends the input information to the CRF to determine the charging rules.

Step 602: the CRF determines the charging method of the current packet data service as the online charging method and determines the appropriate charging rules, according to the input information obtained, and determines the corresponding OCS address information according to the UE information. The input information described above may be the charging-related input information provided by the AF, such as the corresponding service identifier provided by the AF for the CRF when the UE is provided with a certain packet data service by the AF; also, the input information may be the charging-related input information provided by the TPF, such as the UE identifier in the Charging Rules Request provided by the TPF for the CRF.

Step 603: if the CRF determines according to the received input information that the charging rules are modified, for example, when the CRF determines according to the service identifier provided by the AF that the charging method of the current packet data service is online charging method and the UE's fee for using the current packet data service needs to be deducted in real time, or when the CRF determines according to the UE identifier provided by the TPF that the user of the UE is a post-pay user and all the current packet data services used by the UE could be charged after the use of the services, the CRF determines the new charging rules and send to the TPF a Provision Charging Rules message which carries the determined charging rules and the operation instructions for the charging rules, and may further carry the offline charging indication and the OFCS address information.

Step 604: upon receiving the Provision Charging Rules message, the TPF performs the corresponding operations according to the charging rules operation instructions and the charging rules determined by the CRF.

Step 605: the TPF makes the collection for the charging data information of the UE according to the offline charging indication and the filter information in the charging rules, and then sends the collected charging data information of the UE to the corresponding OFCS according to the OFCS address information.

A system for improving service data flow based charging is also provided, which includes: a CRF, a TPF and a charging system, wherein the CRF provides the TPF with the address information of the charging system.

The charging system may be an OCS or an OFCS.

After the CRF provides the TPF with the address information, the TPF may request the credit information from the OCS according to the address information, and the OCS may provide the TPF with the credit information.

The CRF may provide the TPF with the address information of a plurality of OCSs and selection priorities corresponding to the OCSs; the TPF may first request the credit information from the OCS with a highest selection priority, if not succeed, request the credit information from the next OCS in the descending order of the selection priority levels until succeeds.

After the CRF provides the TPF with the address information, the TPF may send the collected charging data information of the UE to the OFCS according to the address information.

The CRF may provide the TPF with the address information of a plurality of OFCSs and the selection priorities corresponding to the OFCSs; the TPF may first send the collected charging data information of the UE to the OFCS with a highest selection priority, if not succeed, send the collected charging data information of the UE to the next OFCS in the descending order of the selection priority levels until succeeds.

The description above is the preferred embodiments rather than limitation of the present invention, any changes and modifications can be made by those skilled in the art without departing from the spirit and scope of the present invention and therefore will be protected by the scope as the set by the appended claims.

What is claimed is:

1. A method for improving service data flow based charging in a communications network, comprising:
   a Charging Rules Function (CRF) determining a charging method and charging rules in response to a service request or other trigger event, and
   the CRF providing a Traffic Plane Function (TPF) with the charging rules and address information of a charging system.

2. The method according to claim 1, wherein the charging system is an Online Charging System (OCS).

3. The method according to claim 2, after the CRF providing the TPF with the address information, further comprising:
   the TPF requesting the credit information from the OCS according to the address information; and the OCS providing the TPF with the credit information.

4. The method according to claim 2, wherein
   the CRF provides the TPF with the address information of a plurality of OCSs and selection priorities corresponding to the OCSs;
   the TPF first requests the credit information from the OCS with a highest selection priority, if not succeed, requests the credit information from the next OCS in the descending order of the selection priority levels until succeeds.

5. The method according to claim 3, wherein the address information is empty, the TPF requests the credit information from an OCS according to pre-configured OCS address information.

6. The method according to claim 2, wherein the address information of the OCS is configured in the CRF.

7. The method according to claim 2, further comprising: the CRF obtaining the address information of the OCS by the interacting with other network entity before the CRF providing the TPF with the address information.

8. The method according to claim 1, wherein the charging system is an Offline Charging System (OFCS).

9. The method according to claim 8, further comprising; the TPF sending collected charging data information of the UE to the OFCS according to the address information.

10. The method according to claim 8, wherein
    the CRF provides the TPF with the address information of a plurality of OFCSs and the selection priorities corresponding to the OFCSs;
    the TPF first sends the collected charging data information of the UE to the OFCS with a highest selection priority, if not succeed, sends the collected charging data information of the UE to the next OFCS in the descending order of the selection priority levels until succeeds.

11. The method according to claim 8, wherein the address information of the OFCS is empty, the TPF sends the collected charging data information of the UE to an OFCS according to pre-configured OFCS address information.

12. The method according to claim 8, wherein the address information of the OFCS is configured in the CRF.

13. The method according to claim 8, further comprising: the CRF obtaining the address information of the OFCS by the interacting with other network entity before the CRF providing the TPF with the address information.

14. The method according to claim 7, wherein the network entity is a Home Location Register (HLR) or Home Subscriber Server (HSS).

15. The method according to claim 13, wherein the network entity is an HLR or HSS.

16. A system for improving service data flow based charging in a communications network, comprising:
a Charging Rules Function (CRF), a Traffic Plane Function (TPF) and a charging system;
wherein the CRF is configured to determine a charging method and charging rules in response to a service request or other trigger event and to provide the TPF with the charging rules and address information of the charging system.

17. The system according to claim 16, wherein the charging system is an Online Charging System (OCS);
after the CRF provides the TPF with the address information, the TPF requests the credit information from the OCS according to the address information, and the OCS provides the TPF with the credit information.

18. The system according to claim 16, wherein the charging system is an OCS;
the CRF provides the TPF with the address information of a plurality of OCSs and selection priorities corresponding to the OCSs; the TPF first requests the credit information from the OCS with a highest selection priority, if not succeed, requests the credit information from the next OCS in the descending order of the selection priority levels until succeeds.

19. The system according to claim 16, wherein the charging system is an Offline Charging System (OFCS);
after the CRF provides the TPF with the address information, the TPF sends the collected charging data information of the UE to the OFCS according to the address information.

20. The system according to claim 16, wherein the charging system is an OFCS;
the CRF provides the TPF with the address information of a plurality of OFCSs and the selection priorities corresponding to the OFCSs; the TPF first sends the collected charging data information of the UE to the OFCS with a highest selection priority, if not succeed, sends the collected charging data information of the UE to the next OFCS in the descending order of the selection priority levels until succeeds.

* * * * *